Aug. 27, 1963  YAT CHUEN YUEN  3,101,779
TEMPERATURE CONTROL APPARATUS AND INSTALLATIONS
Filed July 12, 1960  3 Sheets-Sheet 2
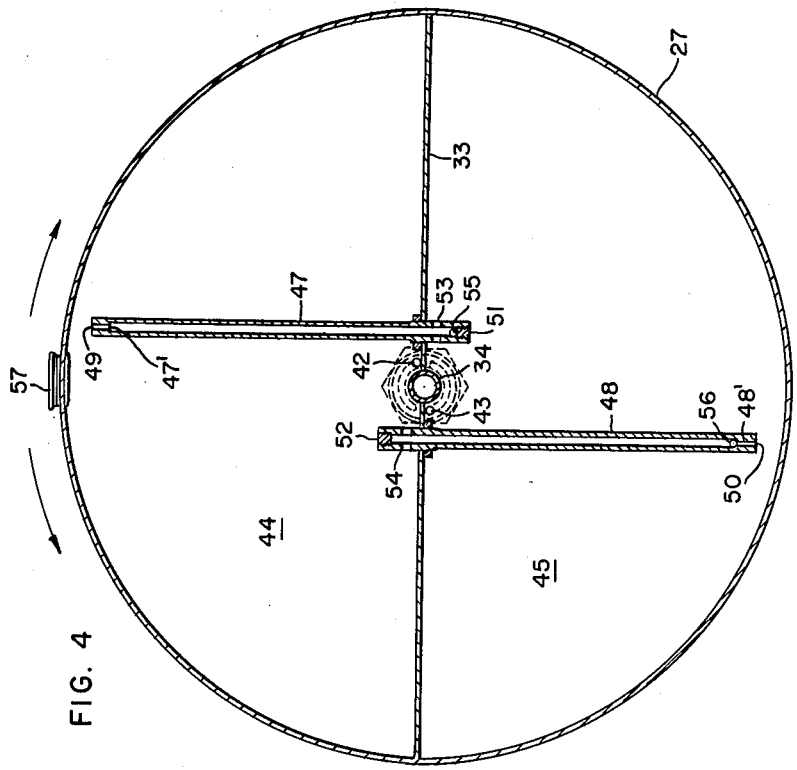
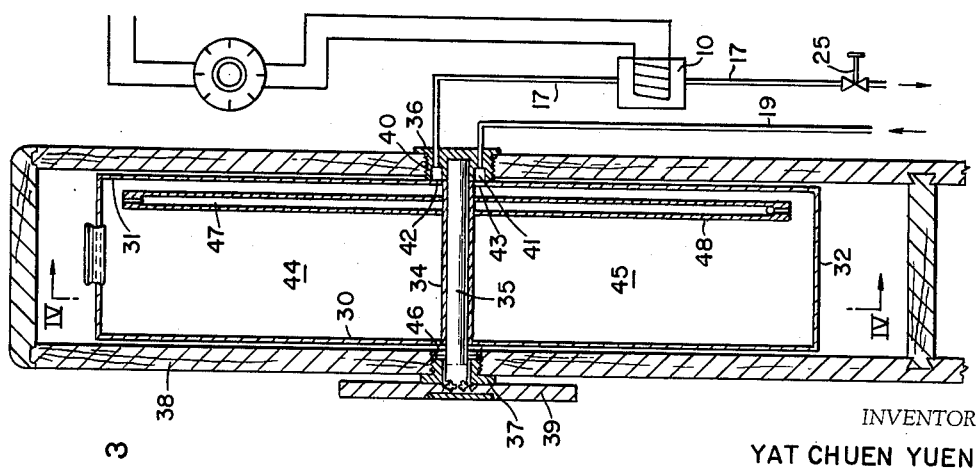
INVENTOR
YAT CHUEN YUEN
BY  J. Ledermann
ATTORNEY Aug. 27, 1963  YAT CHUEN YUEN  3,101,779
TEMPERATURE CONTROL APPARATUS AND INSTALLATIONS
Filed July 12, 1960  3 Sheets-Sheet 3
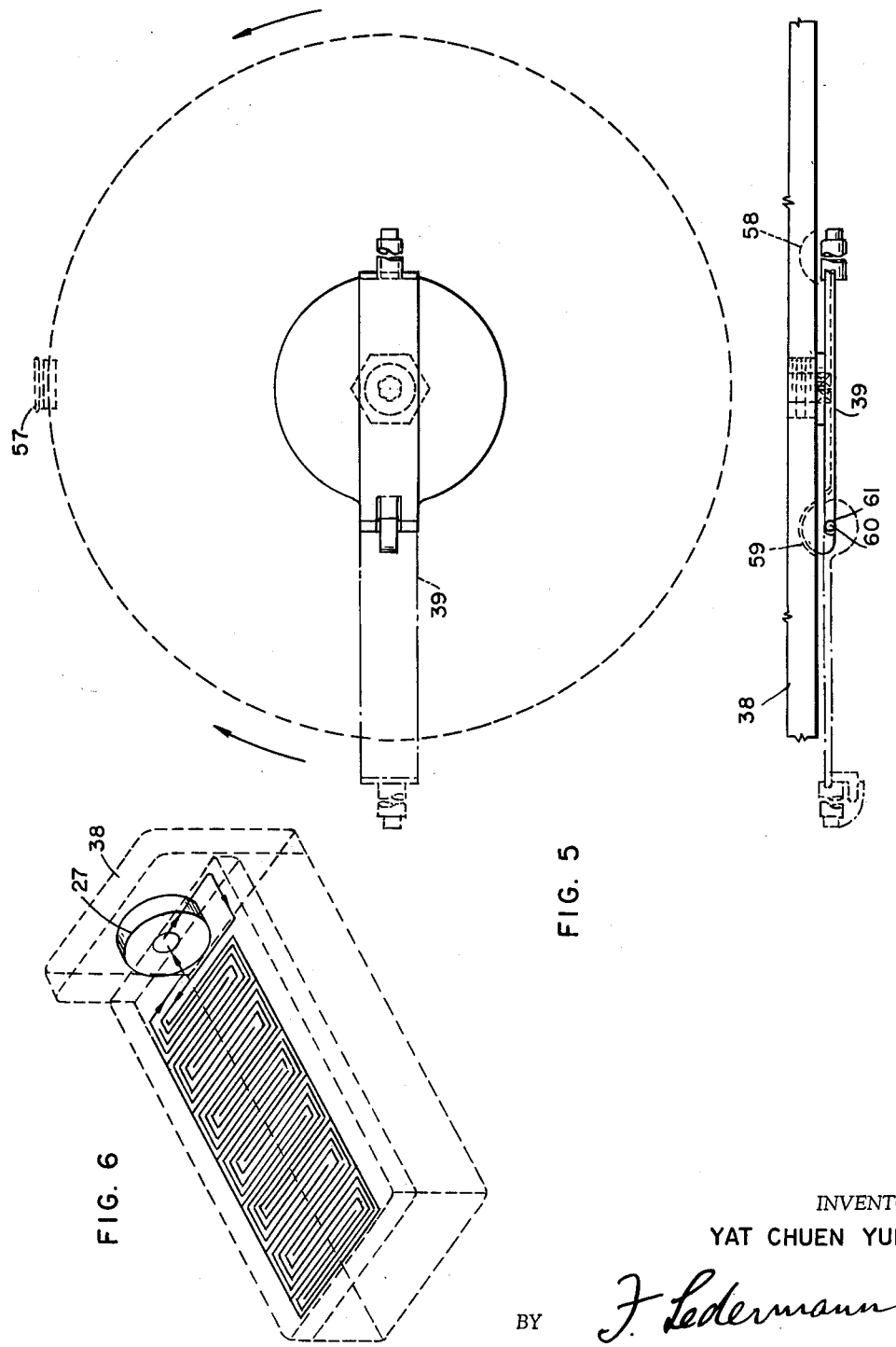
INVENTOR
YAT CHUEN YUEN
BY  *F. Ledermann*
ATTORNEY

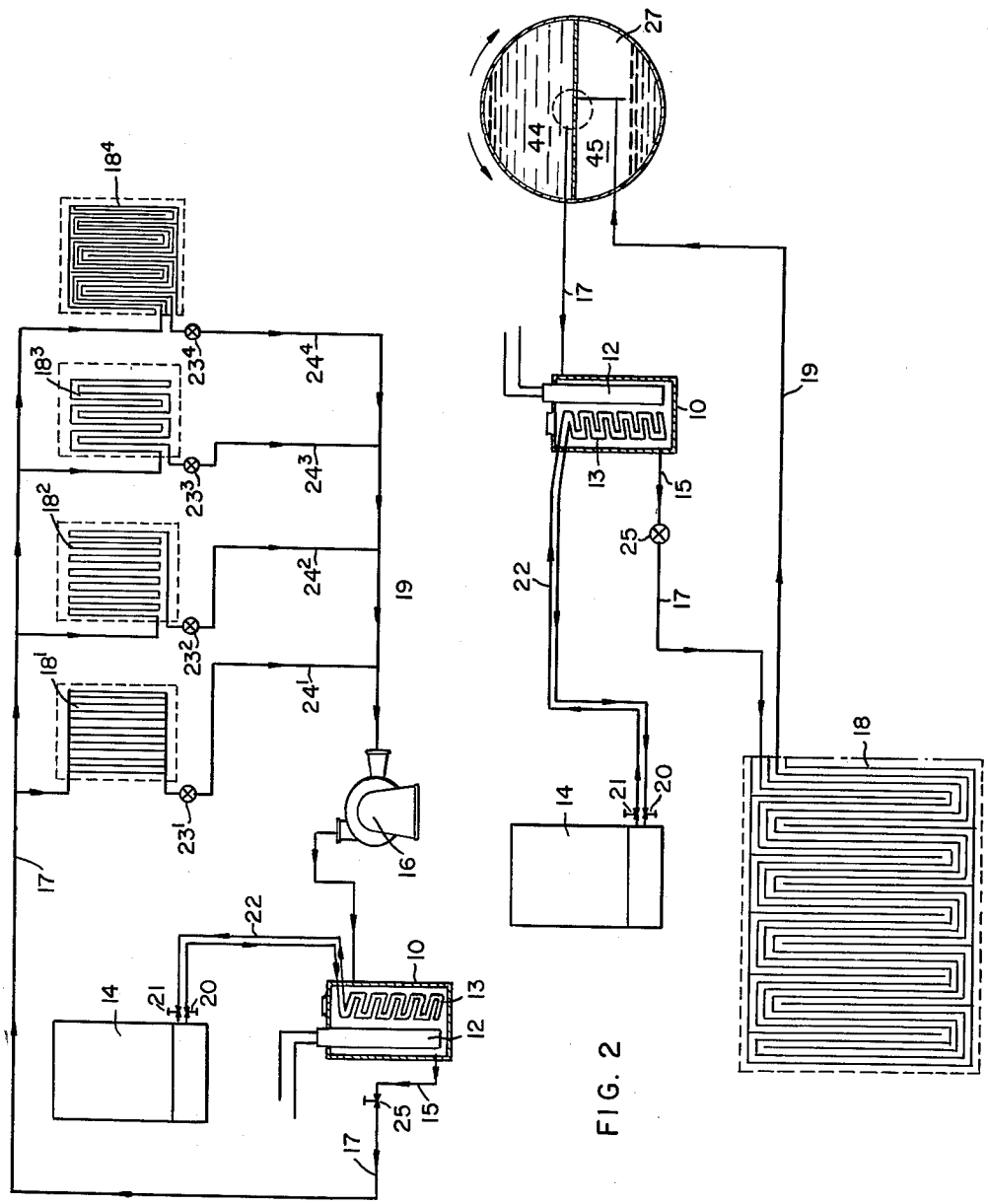

United States Patent Office 3,101,779
Patented Aug. 27, 1963

3,101,779
TEMPERATURE CONTROL APPARATUS AND INSTALLATIONS
Yat Chuen Yuen, 214A Des Voeux Road,
Central, Ground Floor, Hong Kong
Filed July 12, 1960, Ser. No. 42,282
Claims priority, application Great Britain Apr. 7, 1960
2 Claims. (Cl. 165—50)

This invention relates to temperature control apparatus and installations, which comprise a closed circuit through which a temperature control fluid is circulated.

In a temperature control installation or apparatus made in accordance with the present invention the closed circuit comprises a heat or cold accumulator fitted with means for selectively heating or cooling therein the circulating fluid and one or more radiators operatively connected with the accumulator in the closed circuit. The circulating fluid may be a liquid, e.g. water or oil, or a gas, e.g. carbon dioxide, and it may be circulated in the closed circuit by a pump or by gravity.

The heating means may comprise an electrical resistance heater, and the cooling means may comprise a refrigerating fluid supplied to the accumulator, for example, from an external refrigerator. Alternatively, a refrigerant such as solid carbon dioxide may be packed in the accumulator when the installation or apparatus is to be used for cooling purposes.

The radiator or radiators may be of any suitable construction and may be fitted for space heating or cooling, or for local heating or cooling. The radiators may, for example, comprise a coil incorporated in a blanket or like covering for heating or cooling beds, divans and the like. In practice, the flow of the heating or cooling fluid will be controlled by suitably located valves.

In the accompanying drawings which illustrate how the invention may be carried out, FIG. 1 is a diagram illustrating one embodiment of a temperature control installation made in accordance with the present invention;

FIG. 2 is another diagram illustrating another embodiment of a temperature control installation made in accordance with the invention;

FIG. 3 is a vertical sectional view of one part of the installation shown in FIG. 2;

FIG. 4 is a sectional view taken on the line IV—IV of FIG. 3;

FIG. 5 illustrates in side and plan views the construction of the operating crank handle; and FIG. 6 illustrates another embodiment of the invention.

The installation shown in FIG. 1 is designed for space heating or cooling and comprises a heat or cold accumulator 10 consisting of a fluid-tight casing having fitted in the interior thereof an electric immersion type heater 12 and a refrigerating coil 13 arranged to be supplied with a refrigerating fluid obtained from and connected in a closed circut with an external refrigerator 14. The accumulator is fitted with inlet and outlet ports for the circulating fluid, the outlet port being connected by a pipe 15 to a check valve 25. A pump 16 continuously pumps the circulating fluid from the accumulator casing 10 and circulates it through the pipe 17 and one or more radiators, of which four are shown at $18^1$, $18^2$, $18^3$, and $18^4$, suitably located in space, whose temperature is to be controlled. These radiators may be of similar type or, as shown in FIG. 1, they may be of different types. The four radiators are connected in parallel between the supply pipe 17 and the return pipe 19, the former being connected to the discharge outlet of the accumulator 10 and the latter being connected to the inlet port of the pump 16. Valves 20, 21 are provided at the two ends of the pipe 22 which is suitably shaped intermediate its ends to form the refrigerator coil 13. Valves $23^1$, $23^2$, $23^3$, $23^4$ are also fitted respectively in pipes $24^1$, $24^2$, $24^3$, $24^4$ connecting the radiators to the common return pipe 19. A main control valve 25 to control the fluid flow is provided between the heat or cold accumulator and the radiators.

When the installation is in use, if the space whose temperature is to be controlled is to be heated, the valves 20, 21 are closed and the immersion heater 12 is switched in to the current supply. The fluid passing through the accumulator is then heated by the heater and the hot fluid is circulated by the pump 16 through the radiators above-identified and back to the accumulator 10. If the space referred to is to be cooled, the immersion heater 12 is switched off, and the valves 20, 21 controlling the flow of refrigerating fluid to the refrigerating coil 13 are opened, whereupon the refrigerant flows through the coil 13, cooling the circulating fluid therein; the cooled fluid is continuously pumped by the pump 16 and circulated through the radiators and returned to the accumulator for further cooling. In either case the heating or cooling action can be controlled by suitably adjusting the valve 25 and/or the valves $23^1$, $23^4$ in the pipes $24^1$, $24^4$.

FIG. 2 illustrates an arrangement in which the heating or cooling fluid is circulated by gravity. In the embodiment shown, in which parts similar to those previously described are indicated by the same reference numerals, a single radiator 18 is provided, incorporated, for example, in a panel or blanket or other covering or layer suitable for laying on a bed or divan, or over a person reclining in a chair, so as to maintain a comfortable temperature around the person. In this embodiment the pump 16 of FIG. 1 is replaced by a fluid container 27 connected between the return pipe 19 from the radiator and the supply pipe 17. The container 27 is preferably disposed at a higher level than the remainder of the circuit to provide a pressure head which will suffice to circulate the fluid through the closed circuit, the flow being regulated by the valve 25. However, the container can be placed at the same level or even a lower level than the remainder of the circuit providing the difference in fluid levels in the two chambers is such as to provide a pressure head which will circulate the fluid the level of which is kept always above the outlet 42 in the upper chamber (FIG. 4) and providing that the friction of the flow in the circuit is not too great.

In a modification of FIG. 2 the container 27 is eliminated and a domestic water supply pipe is connected to the pipe 17 and hence to the radiator. The pipe 19 from the radiator discharges to waste instead of returning to the accumulator 10.

The construction of the container 27 is illustrated in FIGS. 3–5 of the drawings. The container is circular in side elevation and substantially rectangular in cross-section, and it comprises two circular side plates 30, 31 connected at their edges, as by welding, to and on opposite sides of an annular peripheral plate 32. The flat cylindrical structure thus produced is divided interiorly by a diametrical partition wall 33 extending centrally across the structure into two semi-circular chambers 44, 45 of substantially equal capacity. The partition wall 33 is made from two plates disposed in the same plane with their inner edges spaced apart centrally, this space being axially aligned with a central aperture in each side wall 30, 31 of the container. A hollow axle 34 extends between the side plates and is welded at its ends to the edges of the apertures therein. The axle 34 is also welded to the adjacently disposed edges of the two plates constituting the partition wall 33 so as to seal these plates together in a fluid-tight manner. A spindle 35 passes through the hollow axle and projects from each end thereof, the spindle being fixed to the axle by any suitable means, not shown, and therefore being fixed through the axle to the casing of the container. The two ends of the spindle project respectively from opposite sides of the container and are mounted in bearing apertures in plugs 36, 37 screwed into a support 38. The plug 37 is bored axially throughout its length to receive one end of the spindle and the plug 36 is formed with an axial socket to receive the other end of the spindle. The end of the spindle 35 which engages in the bore in the plug 37 projects beyond this bore and has a squared end to receive an operating arm or lever 39 by means of which the spindle 35, axle 34 and the container 27 can be rotated through an angle of 180 degrees into one or other of alternative operating positions in either of which it is retained by a stop device. The arm or lever 39 is made in two parts hingedly connected by a pin 60 and can be extended into operating position, shown in broken lines in FIG. 5, or folded in an inoperative position shown in full lines. The stop device comprises a semi-circular plate 61, FIG. 5, formed on the operating arm 39 and two oppositely disposed semi-circular recesses 58, 59 formed in the support 38. This arrangement is such that in either end or inoperative position of the arm 39, the plate 61 can be engaged in one or other of the recesses 58, 59 and thus hold the arm in the required position and prevent rotation of the container 27 until the plate 61 is released from the recess 58 or 59 for operation. The inner side of the plug 36 is provided with two arcuate recesses 40, 41 concentric with the plug and disposed, respectively, on opposite sides of the spindle 35 and in permanent communication with apertures 42, 43 provided in the side wall of the container. The aperture 42 is provided in the wall of the semi-circular chamber 44 on one side of the partition 33 and the aperture 43 is provided in the wall of the chamber 45 on the other side of the partition. A fluid tight connection between the container 27 and the plug 36 is ensured by a helical spring 46, FIG. 3, and washer disposed between the plug 37 and the adjacent side wall of the container. In the angular position of the container shown in FIG. 3 the recess 40 is connected by the pipe 17 (see also FIG. 2) to the inlet to the heat or cold accumulator 10 and the recess 41 is connected by the pipe 19 to the outlet end of the radiator or radiators. As will be hereafter explained the container 27 can be rotated through an angle of 180 degrees to a position in which these connections are reversed, i.e., in which the recess 41 is in communication with the pipe 17 and the recess 40 is in communication with the pipe 19. Two air pipes 47, 48 are provided in the interior of the container and are fixed in apertures in the partition 33. The main lengths of these two air pipes project in opposite directions toward the peripheral wall 32 of the container 27, with the open ends of the pipes adjacent to this peripheral wall, the opposite end of each of the pipes projecting for a short distance into the chamber on the opposite side of the partition 33, FIG. 4. These air pipes are each provided at the open end with a reduced passage 49 or 50 and an internal shoulder 47' or 48', respectively, constituting a seat for a ball valve, as shown in FIG. 4. The opposite ends of the pipes are closed by screw plugs 51, 52 and have apertured walls, the apertures 53, 54 being disposed between the plugs 51, 52 and the partition 33.

A metal ball valve 55 or 56 is disposed in each pipe. In the position of the container shown in FIG. 4 the ball 55 rests on the plug 51, and the ball 50 seats on the seat 48', closing the open end of the pipe 48. When the container is subsequently turned through 180 degrees into an alternative position the balls 55 and 50 will drop down the pipes under the action of gravity and in the new position the ball 55 will rest on the seat 47' whilst the ball 50 will seat on the plug 52.

The support for the two spindle bearings may be of any kind; for example, it may be the head board 38 of a divan (FIG. 6) or of a bedstead or settee, or the back of a chair, or the support may be a pedestal or the like, all not shown.

The peripheral wall of the container is formed with an aperture normally closed by a screw cap 57 for initially charging the chamber 44 with an amount of fluid corresponding to requirements or to its capacity, the container having been previously rotated into a position in which the chamber 44 is above the chamber 45. This fluid can be replaced if and when desired.

In use, the chamber 44 or 45 which has been charged with the fluid (which in FIG. 4 is the chamber 44) remains temporarily above the other chamber 45 and as apparent from FIG. 6 is located at a higher level than the remainder of the closed circuit so as to provide a pressure head for the fluid therein. This fluid flows by gravity through the aperture 42 in the side wall of the container into the semi-circular recess 40, FIG. 3, and through the pipe 17 into the accumulator 10, FIG. 2, where it is heated or cooled, as previously mentioned, prior to its subsequent flow through the radiator 18 and back to the lower chamber 45 of the fluid container pipe 19, recess 41, and aperture 43 (FIGS. 2 and 3). The fluid is thus progressively discharged from the chamber 44 and is returned to the chamber 45 which is gradually filled up. Air displaced from the chamber 45 is permitted by the side aperture 53 in the air pipe 47 to flow through this pipe and through the end opening 49 therein into the upper chamber 44. The valve ball 55 in the air pipe 47 is at this time resting on the plug 51 and is inoperative. The air pipe 48 is filled with water through apertures 54 from the upper part 44 of the container and the weight of this water presses the valve ball 50 on its seat and thus prevents flow of water in chamber 44 directly through the pipe 48 into the lower chamber 45. When all the circulating fluid has been discharged from the chamber 44 the container is rotated by turning the operating arm or lever 39 through 180 degrees to bring the chamber 45, now filled with the fluid, into upper position. The recirculation of the fluid then proceeds as previously, the operation of the two air pipes being reversed.

The radiators employed in the system according to the invention may be of any suitable construction. They may for example be formed with flow and return pipes along their longitudinal side edges and a plurality of transverse ducts or passages in communication with the flow and return pipes; or with a continuous zig-zag passage having adjacently disposed inlet and outlet ends at one corner of the radiator; or a continuous zig-zag passage the outlet part of which extends along one side of the radiator with the inlet and outlet ends adjacently disposed at one corner of the radiator.

FIG. 6 illustrates an installation similar to that shown in FIG. 2, in which the radiator 18 is incorporated in a covering for a divan or bed, and the container 27 is mounted in the headboard 38.

The radiators used in an installation according to the invention may be made of any suitable material, e.g., copper, stainless steel, aluminum alloy, natural or synthetic rubber, or of a synthetic plastic material of which an example is nylon. They may also be provided with one or more ducts closed at each end and filled with a noncirculating fluid, the purpose of these closed ducts being to assist in withstanding external pressure.

The radiators may be designed for incorporating them in clothing such, for example, as diving coats, or in mats, cushions, compartment windows, roofs or for installation for space heating or cooling, or in refrigerators, cold storage, vehicles, marine and air craft, for cooling purposes or for melting of ice or as an anti-pressure layer, or as a heat or cold insulating layer.

As above stated, instead of supplying refrigerating fluid from an external refrigerator, when the installation is to be used for circulating a cooling fluid, the circulating fluid may be cooled by a solid refrigerant packed in the accumulator.

I claim:

1. A temperature control apparatus comprising a closed fluid circuit having a temperature control fluid therein adapted to be circulated therethrough, the circuit including a heat and cold accumulator having means for selectively heating or cooling said fluid therein, at least one radiator operatively connected with the accumulator in the circuit, means for circulating the fluid through the circuit comprising a rotatably mounted cylindrical container having a diametrical partition dividing the container into two chambers of substantially equal capacity, the axis of rotation of the container being horizontal and lying substantially in the plane of said partition so that the container may be rotated to alternately bring each of the chambers temporarily into a position in which it is located wholly above the level of the other of said chambers, the container being positioned with respect to the remainder of said closed circuit so that when either of said chambers is in uppermost position it is positioned above the level of said remainder of the closed circuit whereby the fluid flows by gravity from the upper chamber through the remainder of the closed circuit and back into the lower chamber, means for rotating the container, air escape means comprising two pipes extending respectively one into the temporarily upper chamber and the other into the temporarily lower chamber, each such pipe having one end open and the other end closed, said closed end being provided with an apertured side wall projecting into the other chamber whereby when the temporarily lower chamber is being filled with fluid air can escape from the lower chamber through the pipe into the temporarily upper chamber, the apertured side wall in the pipe in the temporarily upper chamber being positioned above the highest level of fluid in the temporarily lower chamber, and valve means in each of said pipes for closing the open end of the pipe in the temporarily upper chamber to prevent fluid therein from passing directly through the pipe into the temporarily lower chamber and for opening the open end of the pipe when the temporarily upper chamber has been rotated into lowermost position.

2. An apparatus according to claim 1 wherein said valve means consists in said open ends of said two pipes having reduced diameters to provide valve seats and a metal ball is confined and freely mounted within each of the pipes so as to move from one end of the pipe to the other end of the pipe under the action of gravity when the container is rotated through 180 degrees, the ball being pressed tightly by its weight and a column of fluid in the pipe against said seat thus preventing fluid in the temporarily upper chamber from passing directly through the pipe into the temporarily lower chamber as aforesaid.

References Cited in the file of this patent

UNITED STATES PATENTS

| | | |
|---|---|---|
| 41,799 | Washburn | Mar. 1, 1864 |
| 804,827 | Corbitt | Nov. 21, 1905 |
| 1,896,953 | Hassell | Feb. 7, 1933 |
| 2,129,427 | Jepertinger | Sept. 6, 1938 |
| 2,260,134 | Ballman | Nov. 21, 1941 |